US005561256A

United States Patent [19]

Aoki et al.

[11] Patent Number: 5,561,256

[45] Date of Patent: Oct. 1, 1996

[54] AUTOMATIC ARRANGEMENT APPARATUS FOR CONVERTING PITCHES OF MUSICAL INFORMATION ACCORDING TO A TONE PROGRESSION AND PROHIBITION RULES

[75] Inventors: Eiichiro Aoki, Hamamatsu; Kazunori Maruyama, Tama, both of Japan

[73] Assignee: Yamaha Corporation, Shizuoka-ken, Japan

[21] Appl. No.: 382,569

[22] Filed: Feb. 2, 1995

[30] Foreign Application Priority Data

Feb. 3, 1994 [JP] Japan .................................... 6-011553

[51] Int. Cl.[6] .............................. G10H 7/00; H02M 5/00

[52] U.S. Cl. .................................. 84/619; 84/609; 84/637

[58] Field of Search ............................. 84/609, 613, 619, 84/634, 637, 657

[56] References Cited

U.S. PATENT DOCUMENTS 4,664,010 5/1987 Sestero ..................................... 84/613
5,418,325 5/1995 Aoki et al. ................................ 84/613
5,442,129 8/1995 Mohrlok et al. .......................... 84/637

FOREIGN PATENT DOCUMENTS 62-187892 8/1987 Japan .

*Primary Examiner*—William M. Shoop, Jr.
*Assistant Examiner*—Jeffrey W. Donels
*Attorney, Agent, or Firm*—Rossi & Associates

[57] ABSTRACT

In an automatic arrangement apparatus having an accompaniment information memory for memorizing an accompaniment pattern, a specific basic part such as a melody part for arrangement of a musical tune, a chord progression and an arrangement condition are applied to select an accompaniment pattern conformed with the arrangement condition from the accompaniment information memory thereby to produce musical information in the form of a pattern sequence of plural parts relative to the basic part, and the pattern sequence of the plural parts is converted in tone pitch in accordance with the chord progression. In the automatic arrangement apparatus, a tone resulting in an inappropriate tone pitch difference for the arrangement of the musical tune is prohibited under a first prohibition rule related to a relationship between the plural pares, and a tone resulting in an inappropriate chord progression for the arrangement of the musical tune is prohibited under a second prohibition rule related to the chord progression. The musical information is corrected to appropriate musical information for the arrangement of the musical tune if the tone prohibited under the prohibition rules is included therein.

5 Claims, 10 Drawing Sheets

PROHIBITION
OF MINOR 9TH INTERVAL

PROHIBITION
OF PARALLEL 5TH
PROGRESSION

AUTOMATIC ARRANGEMENT APPARATUS FOR CONVERTING PITCHES OF MUSICAL INFORMATION ACCORDING TO A TONE PROGRESSION AND PROHIBITION RULES

BACKGROUND OF THE INVENTION

1. Field of the Invention

The present invention relates to an automatic arrangement apparatus wherein musical information is produced in the form of a pattern sequence of plural parts relative to a specific basic part for arrangement of a musical tune and converted in tone pitch in accordance with a tone progression such as a chord progression.

2. Description of the Prior Art

Although an automatic arrangement apparatus of this kind is not known heretofore, there has been proposed a chord sequencer or an automatic accompaniment apparatus for automatically converting in tone pitch tone pitch information applied thereto to effect similar processing to an automatic arrangement in a broad sense. The chord sequencer is designed to be applied with a pattern sequence indicative of a musical tune. In the Form of tone pitch information of a predetermined scale such as C Major and a chord progression indicative of variation of a chord of the musical tune or converting in tone pitch the tone pitch information of the pattern sequence in accompaniment with the Foot and type of the chord aim for producing a part conformed with the chord progression. The automatic accompaniment apparatus is adapted to an electronic musical instrument of the keyboard type, which is designed to memorize an accompaniment pattern indicative of tile kind of a musical tune such as a music genre in the form of a tone pitch information of a predetermined scale for converting in tone pitch the tone pitch information of the memorized accompaniment pattern in accordance with the root and type of a chord applied from the keyboard of the musical instrument.

In the chord sequencer or the automatic accompaniment apparatus, however, the tone pitch information is apt to be converted into a musically inappropriate tone pitch in relation to the flow of a melody and an interval of another part. For this reason, even if the chord sequencer or the automatic accompaniment apparatus was applied to the electronic musical instrument, an automatic arrangement would not be effective in an appropriate manner. Although there has been also proposed an automatic accompaniment apparatus wherein a chord is compared with an accompaniment tone obtained by tone pitch conversion to correct the accompaniment tone if It is excessively high in tension degree. The accompaniment apparatus is, however, insufficient for automatic arrangement.

SUMMARY OF THE INVENTION it is, therefore, a primary object of the present invention to provide an automatic arrangement apparatus capable of reducing a musically inappropriate portion between the respective parts during or after automatic arrangement.

According to the present invention, the object is accomplished by providing an automatic arrangement apparatus which comprises means for producing musical information in the form of a pattern sequence of plural parts relative to a specific basic part for arrangement of a musical tune; conversion means for converting in tone pitch the musical information in accordance with a tone progression; memory means for memorizing a first prohibition rule related to a relationship between the plural parts to prohibit a tone resulting in an inappropriate tone pitch difference for the arrangement of the musical tune and a second prohibition rule related to the tone progression to prohibit a tone resulting in an inappropriate tone progression for the arrangement of the musical tune; determination means for determining whether a tone prohibited under the prohibition rules is included in the musical information or not; and correction means for correcting the musical information of the plural parts to appropriate musical information for the arrangement of the musical tune if the tone prohibited under the prohibition rules is included therein.

Preferably, the memory means in the automatic arrangement apparatus is adapted to further memorize a third prohibition rule related to an order of two parts in tone pitch to prohibit a successive tone when two parts of the plural parts arc reversed in tone pitch for a predetermined tone length the determination means is arranged to further determine whether a successive tone prohibited under the third prohibition rule is included in the musical information or not and the correction means is arranged to further correct the musical information of the plural parts to appropriate musical information for the arrangement of the musical tune If the successive tone prohibited under the third prohibition rune is included therein.

In a practical embodiment of the present invention, the first prohibition rule is defined to prohibit a tone resulting in a tone pitch difference of a minor 9th interval and to prohibit a tone resulting in a parallel 5th progression, and the second prohibition rule is defined to prohibit a successive tone when the tone progression changes from a dominant 7th chord to a tonic chord.

BRIEF DESCRIPTION OF THE DRAWINGS

Other objects, feature and advantages of the present invention will be more readily appreciated from the following detailed description of a preferred embodiment thereof when taken together with the accompanying drawings, in which;

FIG. 7;

DESCRIPTION OF THE PREFERRED EMBODIMENT

Figure 1:
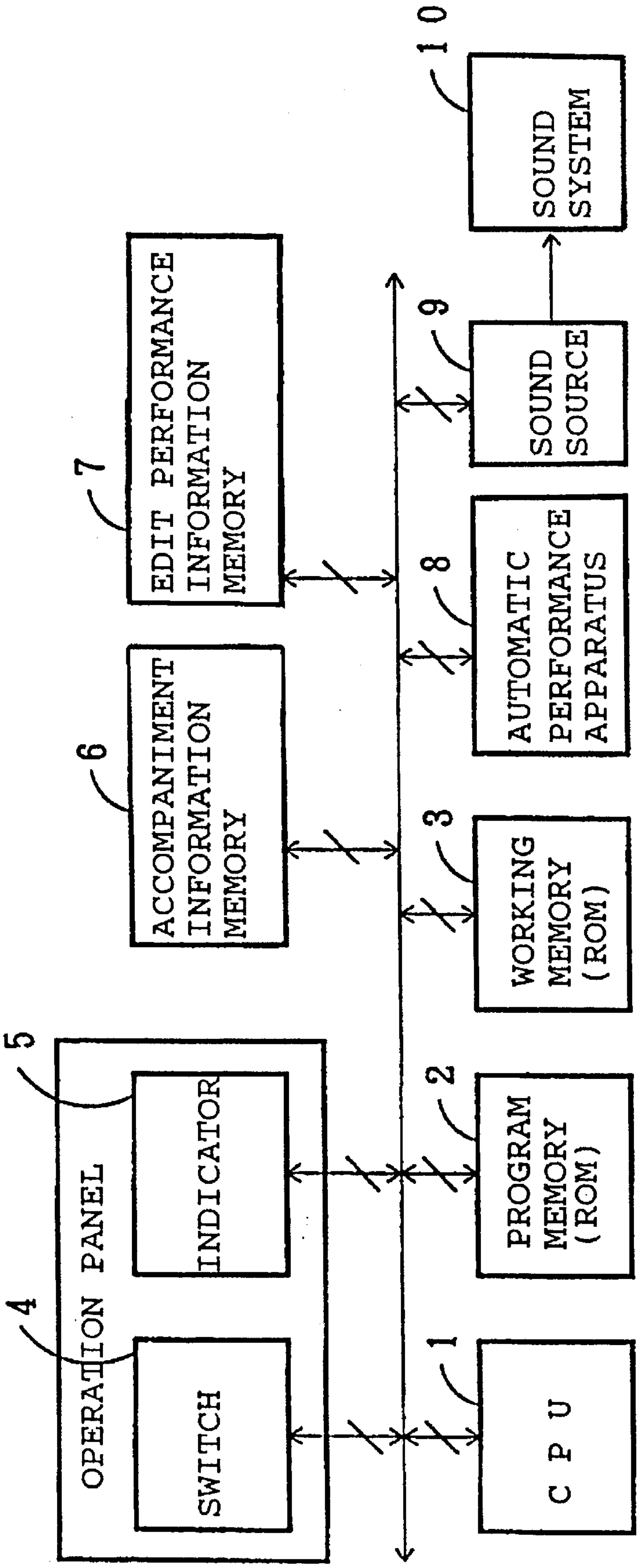
FIG. 1 is a schematic illustration of a block diagram of an automatic arrangement apparatus in accordance with the present invention.

In FIG. 1 of the drawings, there is schematically illustrated a block diagram of an automatic arrangement apparatus in accordance which the present invention. The automatic arrangement apparatus includes a central processing unit or CPU 1 which is designed to use a working area of a working memory 3 for executing a control program stored in a program memory 2 in the form of a read-only memory or ROM thereby to effect an automatic arrangement at an edit mode and to effect an automatic performance at a performance mode. The automatic arrangement apparatus has an operation panel which is provided with various kinds of switches 4 such as an edit switch for designating an edit mode, a start/stop switch for automatic performance, an input switch for input of various data, etc. and provided with an indicator 5. The CPU 1 is arranged to detect an operation event of the switches 4 and indicate various data on tile indicator 5 and to control input of a mode designation, a melody as a specific part of an original musical tune, a chord progression and an arrangement condition such as the style, dynamics or musical form a musical tune, to be automatically arranged.

The automatic arrangement apparatus further includes an accompaniment information memory 6 and an edit performance information memory 7. The accompaniment information memory 6 is in the form of a read-only memory which is arranged to memorize various accompaniment patterns of a predetermined length such as one or two measures in compliance with various arrangement conditions. When a melody, a chord progression and an arrangement condition are set by a user at an edit mode, the CPU 1 memorizes the melody in the edit performance information memory 7 and reads out an accompaniment pattern conformed with the arrangement condition from the accompaniment information memory 6 for producing a pattern sequence composed of respective parts of a musical tune. Thus, the CPU 1 temporarily memorizes the pattern sequence in the edit performance information memory 7. Subsequently, the CPU 1 converts in toxic pitch the tone pitch information of the memorized pattern sequence in accordance with the chord progression and memorizes the converted pattern sequence as performance information in the edit performance information memory 7. Thereafter, the CPU 1 corrects tone pitch information included in the performance information in accordance with a prohibition rule memorized as a program data in the program memory 2 and memorizes the corrected tone pitch information in the edit performance information memory 7 for finish of an automatic arrangement.

Figure 2:
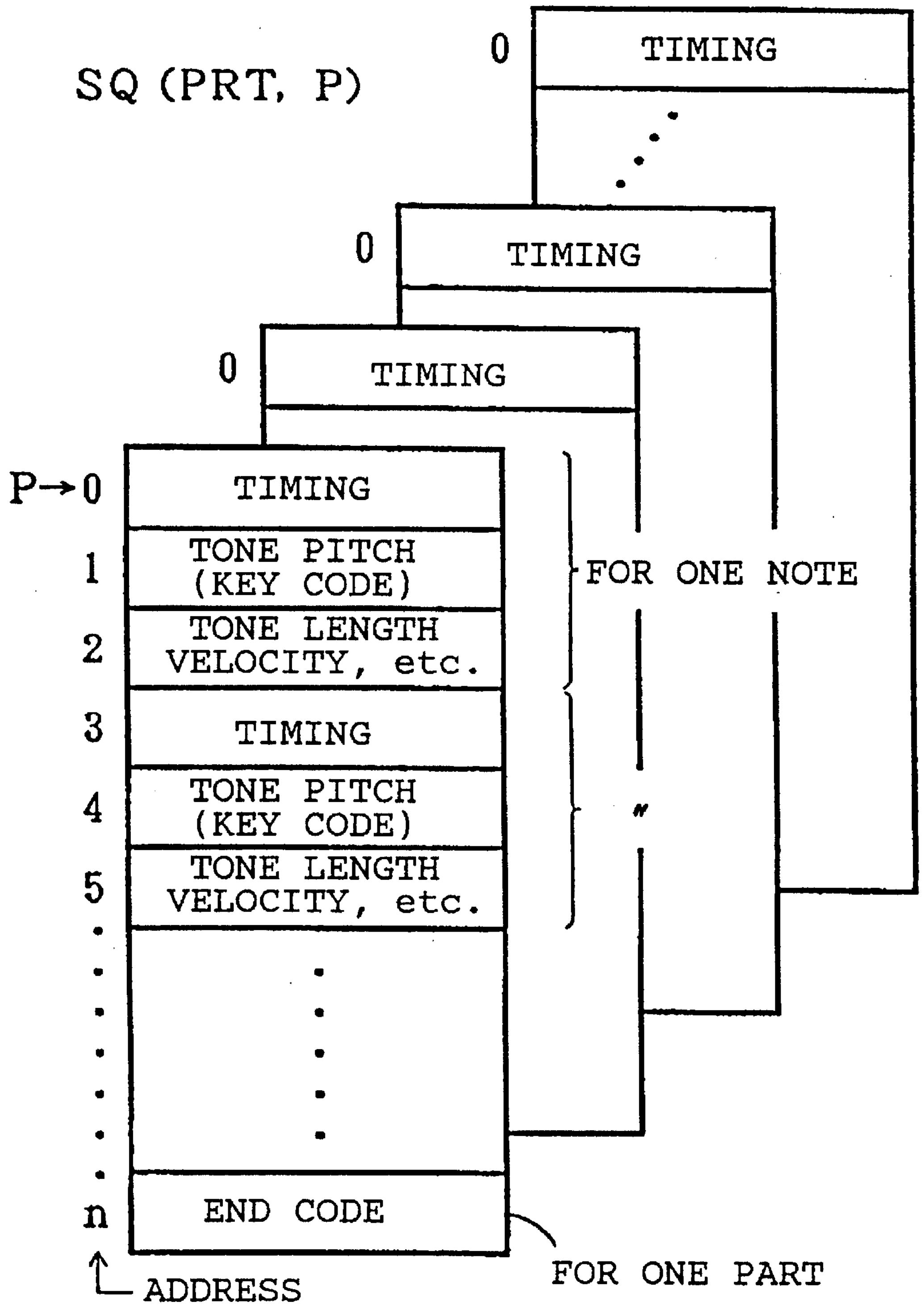
FIG. 2 is an illustration of memory formats of parts stored in an edit performance information memory shown FIG. 1.

In this embodiment, the pattern sequence and performance information are composed of seven parts such as a melody part applied as an original musical tune, a bass part produced by the automatic arrangement, a counter melody part, a first backing part (1) (a top note), a second backing part (2), a third backing part (3) and a drum part. The performance information of the respective parts produced by tile melody or the automatic arrangement is represented by a predetermined clock value which is adapted as a unit or a timing data to correspond, for instance, a quarter note with twenty four (24) clocks. For example, each memory format of the parts in the edit performance information memory 7 is formed as shown in FIG. 2, wherein a tone pitch (a key code) of a note, a note length, a velocity and other data for each note are memorized as musical tone information with a timing data represented by a count value of the clocks for sound of the note, and an end code is memorized at the end of the respective parts. Each memory area SQ (PRT, P) of the parts is provided with an address increasing from "0" an every part. Each of the memorized data is read out by a pointer PRT (or CPRT) and a pointer P, and the respective data are memorized from the head of the address in order of a sound timing.

The automatic arrangement apparatus is associated with an automatic performance apparatus 8 which is designed to start automatic performance, at a performance mode in response to a start signal applied thereto from the CPU 1 and to halt the automatic performance when applied with a stop signal from the CPU 1. During the automatic performance, the automatic performance apparatus 8 reads out the timing data from The respective parts of the performance information and applies musical data such as a key code, a note-on/note off, a tone color number of a drum, a velocity to a sound source in accordance with the timing data. The sound source 9 produces a musical tone signal in accordance with the applied musical data and causes a sound system 10 to sound the musical tone signal.

Figure 3A:
FIGS. 3(A) and 3(B) each illustrate an example of a prohibition rule adapted to the arrangement apparatus shown in FIG. 1.
Figure 3B:

In this embodiment, the prohibition rule described above is classified into a first rule $\alpha$, a second rule $\beta$ and a third rule $\tau$. The first rule a is related to a relationship between the parts of the performance information to prohibit a tone resulting in a tone pitch difference of the minor 9th interval and to prohibit a tone resulting in the parallel 5th progression. For example, as shown in FIG. 3(A), a "G" tone of a backing part resulting in a tone pitch difference of the minor 9th interval related to an "A♭" tone of a melody part is prohibited, and as shown in FIG. 3(B), the successive "D" tone in "C–D" tones of a backing part resulting in the parallel 5th progression related to "G–A" tones of a melody part is prohibited.

The second rule $\beta$ is related to a chord progression to prohibit a successive tone when the chord progression changes from the dominant 7th chord "V7" to the tonic chord "I". Namely, the second rule $\beta$ is defined to prohibit a successive tone when a melody tone related to a bass part, a counter melody part and a backing part changes from the 4-degree note "IV" to the 3-degree note "III" during the dominant motion or changes from the 7-degree note "VII" to the root note "I".

The third rule $\tau$ is related to an order of two tones in tone pitch to prohibit a successive tone when the parts are reversed in tone pitch for more than a half note length. In this instance, the tone pitch of the two parts is determined in order of the melody part, the counter melody part, the backing parts (1), (2), (3) and the bass part from a high level.

The tones prohibited by the first rule $\alpha$ and second rule $\beta$ are substituted for a chord constituent tone, and the tone prohibited by the third rule $\tau$ is substituted for a tone shifted by one octave. Although in the foregoing example, the melody part is processed as a basic part for correction of the other parts, the bass part is processed as a basic part for correction of the counter melody part, and the bass part and counter melody part are processed as a basic part for correction of the backing parts.

Figure 4:
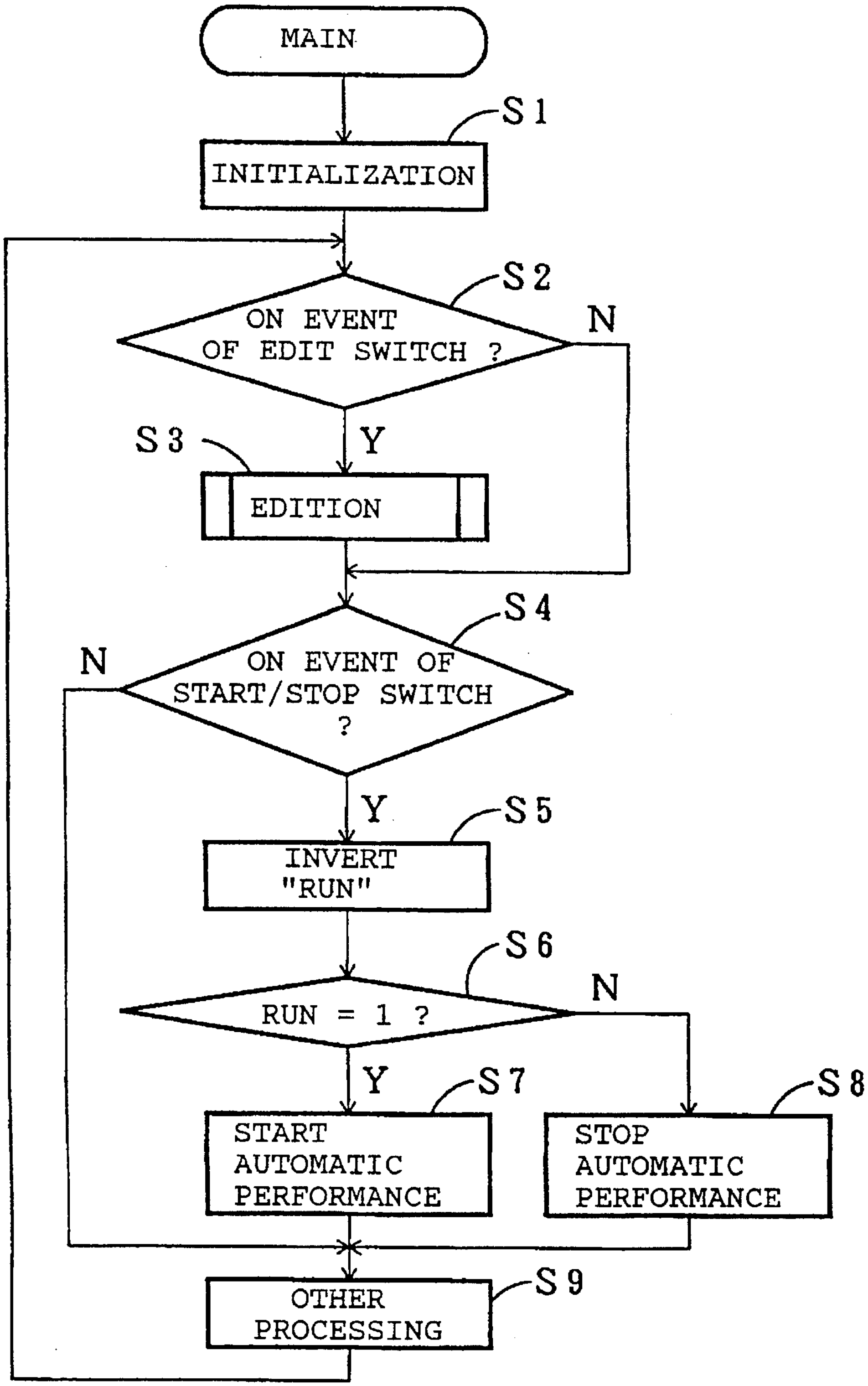
FIG. 4 is a Flow chart of a main routine of a control program executed by a central processing unit or CPU shown in FIG. 1.

A flow chart of a main routine of the control program is illustrated in FIG. 4, and floe charts of sub-routines of the control program are illustrated in FIGS. 5 to 10. Hereinafter, operation of the automatic arrangement apparatus will be described with reference to these flow charts. In the following description, respective registers and flags are labeled as listed below.

RUN: Flag for start/stop of automatic performance

PRT: Part number indicative of a part to be corrected

CPRT: Part number of a basic part for correction

P: Pointer of performance information

SQ(PRT, P): Data represented by "P" of a part indicated by PRT of the performance information TM: Current timing data KC: Current key code PKC: Preceding key code SCC: Flag indicative presence of a prohibition tone (1 : Presence, 0 : None)

RT: Root, of a chord

TP: Type of a chord

ORT: Root of a preceding chord

OTP: Type of a preceding chord

Assuming that the automatic arrangement apparatus has been connected to an electric power source, the CPU 1 is activated to initiate processing of the main routine shown in FIG. 4. At step S1, the CPU 1 initializes flags and registers and determines at step S2 whether the edit switch has been operated or not. If the answer at step S2 "Yes", the program proceeds to step S3 where the CPU 1 executes processing of an edit routine shown in FIG. 5 and causes the program to proceed to step S4.

At step S4, the CPU 1 determines whether the start/stop switch has been operated or not. If the answer at step S4 is "No", the program proceeds to step S9. If the answer at step S4 is "Yes", the CPU 1 inverts the flag RUN at step S5 and determines at step S6 whether the flag RUN is "1" or not. If the answer at step S6 is "Yes", the CPU 1 applies at step S7 a start signal to the automatic performance apparatus 8 and returns the program step S2 after processing at step S9. If the answer at step S5 is "No", the CPU 1 applies at step S8 a stop signal to the automatic performance apparatus 8 and returns the program co step S2 after processing at step S9. With the above processing, an edit mode is selected by operation off the edit switch, and an automatic performance mode is selected by operation of the start/stop switch to activate the automatic performance apparatus 8.

Figure 5:
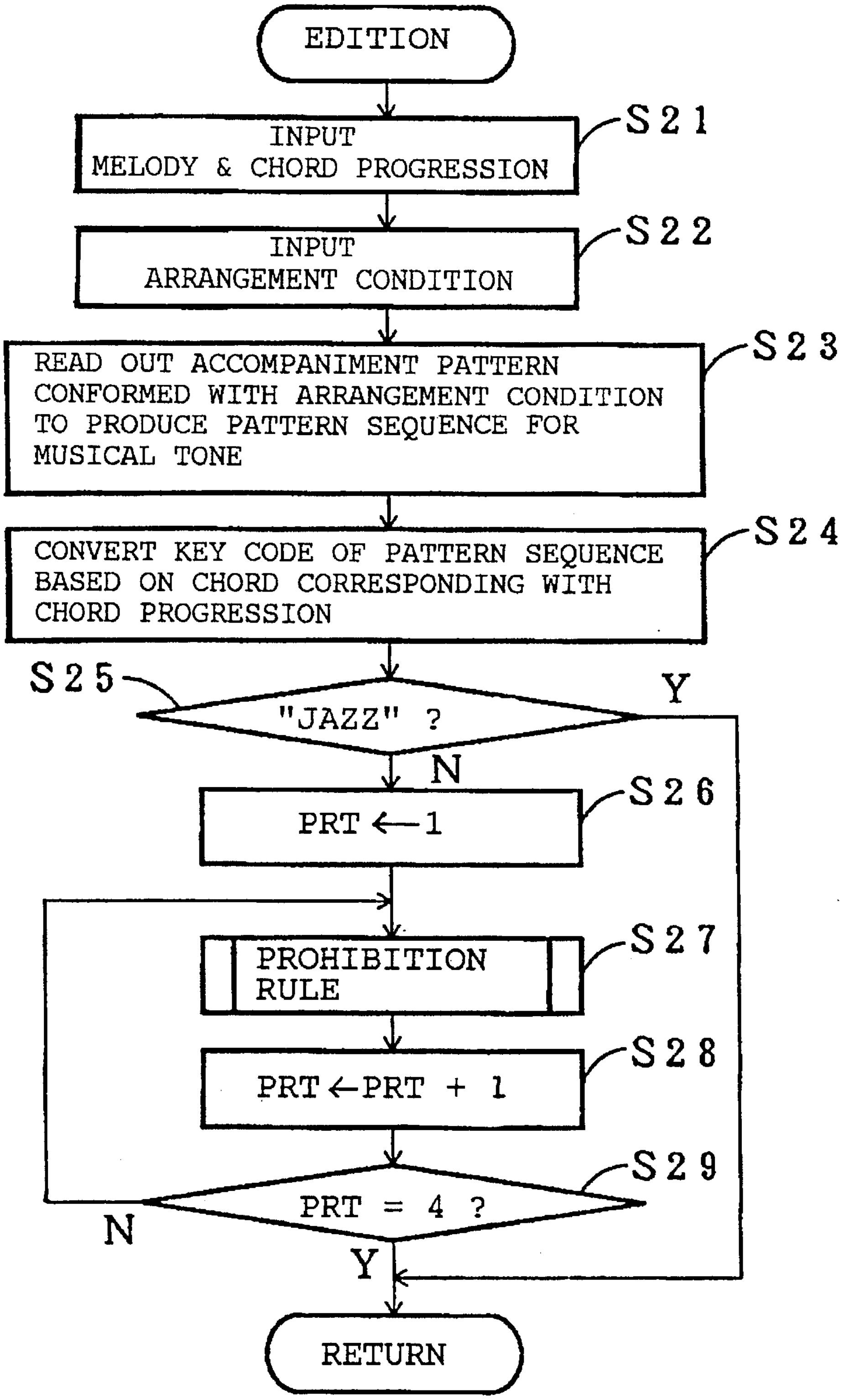
FIG. 5 is a flow chart of an edit routine of the control program.

In execution of the edit routine shown in FIG. 5, the CPU 1 detects at step S21 operation of the edit switch and controls the indicator to read cut a melody of an original musical tune and its chord progression. At the following step S22, the CPU 1 detects operation of the switches 4 and controls the indicator to read out various arrangement conditions. When the program proceeds to step S23, the CPU 1 reads out an accompaniment pattern conformed with the arrangement conditions from the accompaniment information memory 6 for producing a pattern sequence composed of respective parts of a musical tune on a basis of a musical form defined by the arrangement conditions. Thus, time CPU 1 temporarily memorizes the pattern sequence in the edit performance information memory 7 in the form of the formats shown in FIG. 2.

Subsequently, the, the CPU 1 converts in tone pitch at step S24 a key code data of the memorized pattern sequence based on a chord corresponding with the chord progression to memorize the converted key code data as performance information in the edit performance information memory 7 in the form of the formats shown in FIG. 2 and causes the program to proceed to step S25.

In a music genre such as "Jazz", there are many cases where even a tone to be prohibited at another music genre is useful to enhance a feeling or mood of the musical tune. For this reason, the CPU 1 determines at step S25 whether a the style of the arrangement conditions is "jazz" or not. If the style is "Jazz", the CPU 1 returns the program to the main routine. If the answer at step S25 is "No", the program proceeds to step S26 where the CPU 1 sets "1" in the, register PRT and causes the program to proceed to step S27. At step S27, the CPU 1 executes a prohibition rule routine shown in FIG. 6. After execution of the prohibition rule routine, the CPU 1 adds "1" to the register PRT at step S28 and determines at step S29 whether the part number PRT is "4" or not. If the answer at step S29 is "No", the program returns to step S27. If the answer at step S29 is "Yes", the program returns to the main routine. In this embodiment, the part number designated at the edit performance information memory 7 is determined in such manner that the melody part is "0", the bass part is "1", the counter melody part is "2", the backing part (1) is "3", the backing part (2) is "4", the backing part (3) is "5" and the drum part is "6". Accordingly, the bass part (PRT=1), the counter melody part (PRT=2) and the backing part (1) (PRT=3) are successively processed under the following prohibition rule in accordance with increment of the register PRT.

Figure 6:
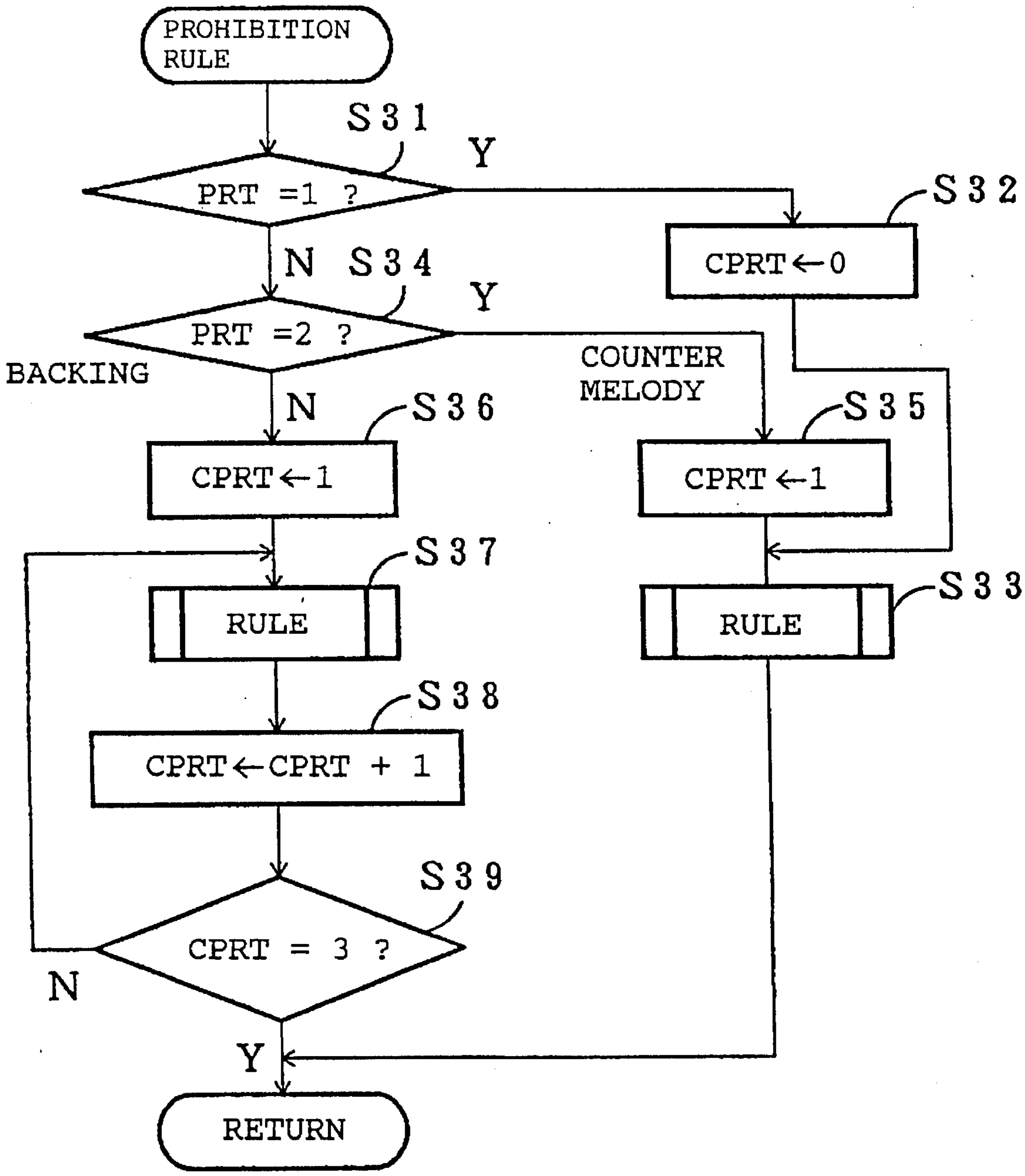
FIG. 6 is a flow chart of a prohibition rule routine of the control program.

In processing of the prohibition rule routine shown FIG. 6, the CPU 1 determines at step S31 whether the part number PRT is "1" or not. If the answer at step S31 is "Yes", the CPU 1 sets at step S32 "0" in the register CPRT and executes at step S33 a rule routine shown in FIG. 7 If the answer at stop S31 is "No", the CPU 1 determines at step 534 whether the part number PRT is "2" or not. If the answer at step S34 is "Yes", the CPU 1 sets all step S35 "1" in the register CPRT and executes at step S33 the rule routine shown in FIG. 7. If the answer at step S34 is "No", the CPU 1 sets at step S36 "1" in the register CPRT and executes at step 537 the rule routine shown in FIG. 7. After processing the rule routine at step S37, the CPU 1 adds at step S38 "1" to the register CPRT and determines at step S39 whether the part number CPRT is "3" or not. If the answer at step S39 is "No", the program returns to step S37 for execution of the rule routine. If the answer at step S39 is "Yes", the program returns to the edit routine shown in FIG. 5.

That is to say, the prohibition rule routine will be executed as follows. When a part to be corrected is the bass part (PRT=1), the melody part (CPRT=0) is adapted as a basic part for execution of the rule routine at step S33. When the part to be corrected is the counter melody part (PRT=2), the bass part (CPRT=1) is adapted as a basic part for execution of the rule routine at step S37. When the part to be corrected is the backing part (1) (PRT=3), the bass part (CPRT=1) is first adapted as a basic part for execution of the rule routine at step S37, and the counter melody part (CPRT=2) is adapted as a basic part for execution of the rule routine at step S37.

Figure 7:
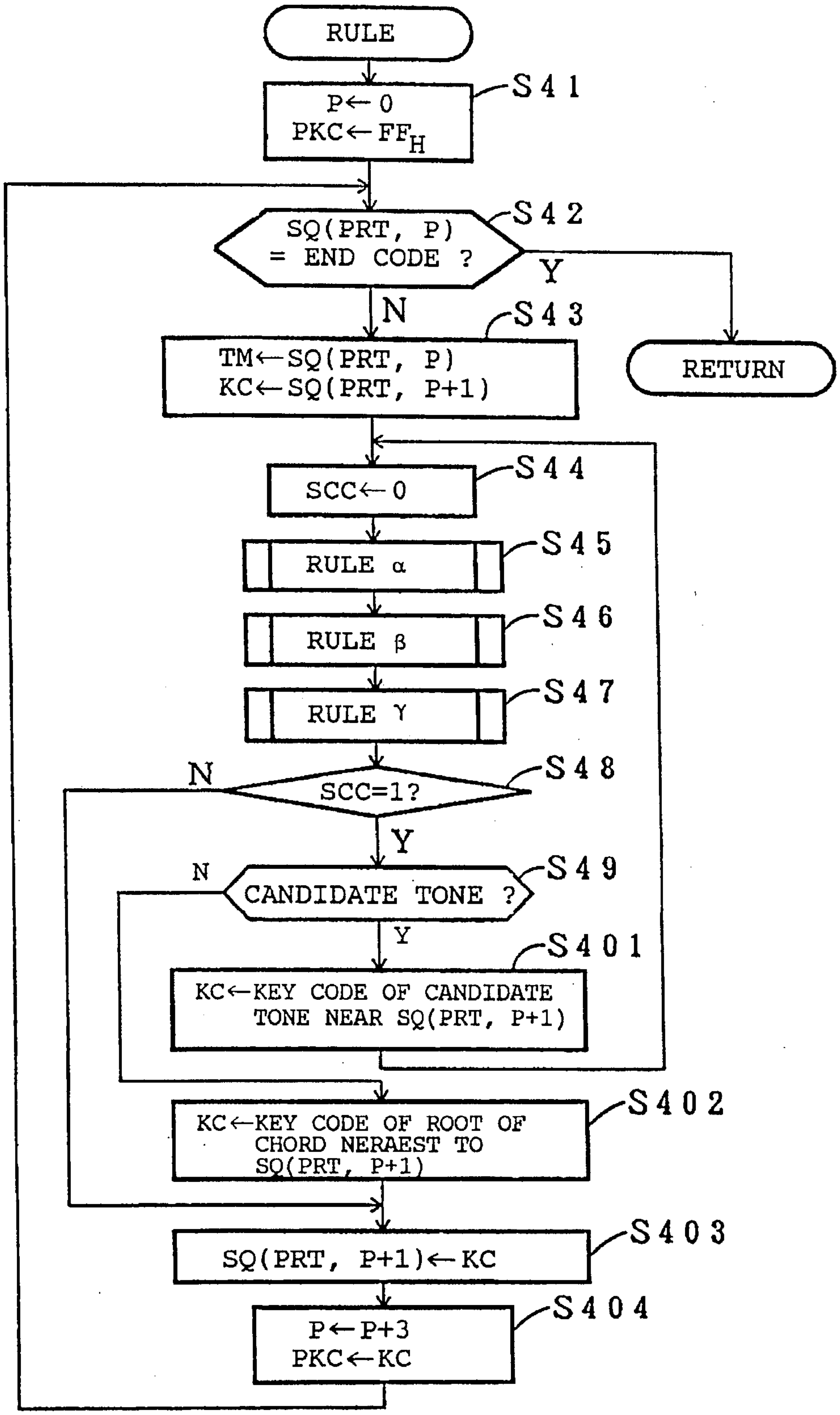
FIG. 7 is a flow chart of a rule routine shown in FIG. 6.

In processing or the rule routine shown in FIG. 7, the CPU 1 resets at step S41 the pointer P as "0" and sets a defort value "$FF_H$" as a preceding key code in the register PKC. (the character "H" represents the fact that a preceding value is a sixteen (16) notation. ) When the program proceeds to step S42, the CPU determines whether the data SQ(PRT, P) is an end code or not. If the answer at step S42 is "No", the program proceeds to step S43 where the CPU 1 reads out the data SQ(PRT, P) of the current part PRT from the edit performance information memory 7 to store it in the register TM and reads out the key code SQ(PRT, P+1) from the edit performance information memory 7 to store it in the register KC. Subsequently, the CPU 1 sets at step S44 the flag SCC indicative off presence or a prohibition tone as "0" and causes the program to proceed to step S45. Thus, the CPU 1 executes at step S45 processing of the first rule α shown in FIG. 8 and executes at step S46 processing of the second rule β shown in FIG. 9. The CPU 1 further executes at step S47 processing of the third rule τ shown in FIG. 10.

When the program proceeds to step S48, the CPU 1 determines whether the flag SCC is "1" or not. If the current note is not determined as a prohibition tone by processing off the rules α, β, τ, the CPU 1 determines a "No" answer at step S48 and stores at step S403 the key code KC of the current note in the memory area SQ(PRT, P+1) of the edit performance information memory 7. If the current note is determined as a prohibition tone by processing of the rules α, β, τ, the CPU 1 determines a "Yes" answer at step S48 and determines at step S49 whether a successive candidate tone exists in the chord constituent tone or not. If the answer at step 549 is "Yes", the program proceeds to stop S401 where the CPU 1 stores a key code of a candidate tone near the data SQ(PRT, P+1) in the register KC and returns the program to step S44. When two tones in the same internal difference exist in the candidate tones, a key code of a higher tone is stored in the register KC. If the answer at step S49 is "No", the program proceeds to step S402 where the CPU 1 stores a key code of the root of chord nearest to the data SQ(PRT, P+1) in the register KC and causes the program to proceed to step S403.

When the data SQ(PRT, P) becomes an and code by repetitive execution of the foregoing processing, the CPU 1 determines a "Yes" answer at step S42 and causes the program to proceed to the prohibition rule routine shown in FIG. 6. Accordingly, if any prohibition tone does not exist in the current part PRT to be corrected, the CPU 1 stores the current key code as a key code of performance information in the edit performance information memory 7. If there is a prohibition tone in the current part to be corrected, the CPU 1 corrects the current key code to a key code selected from the chord constituent tone and stores the corrected key code as a key code of the performance information in the edit performance information memory 7.

Figure 8:
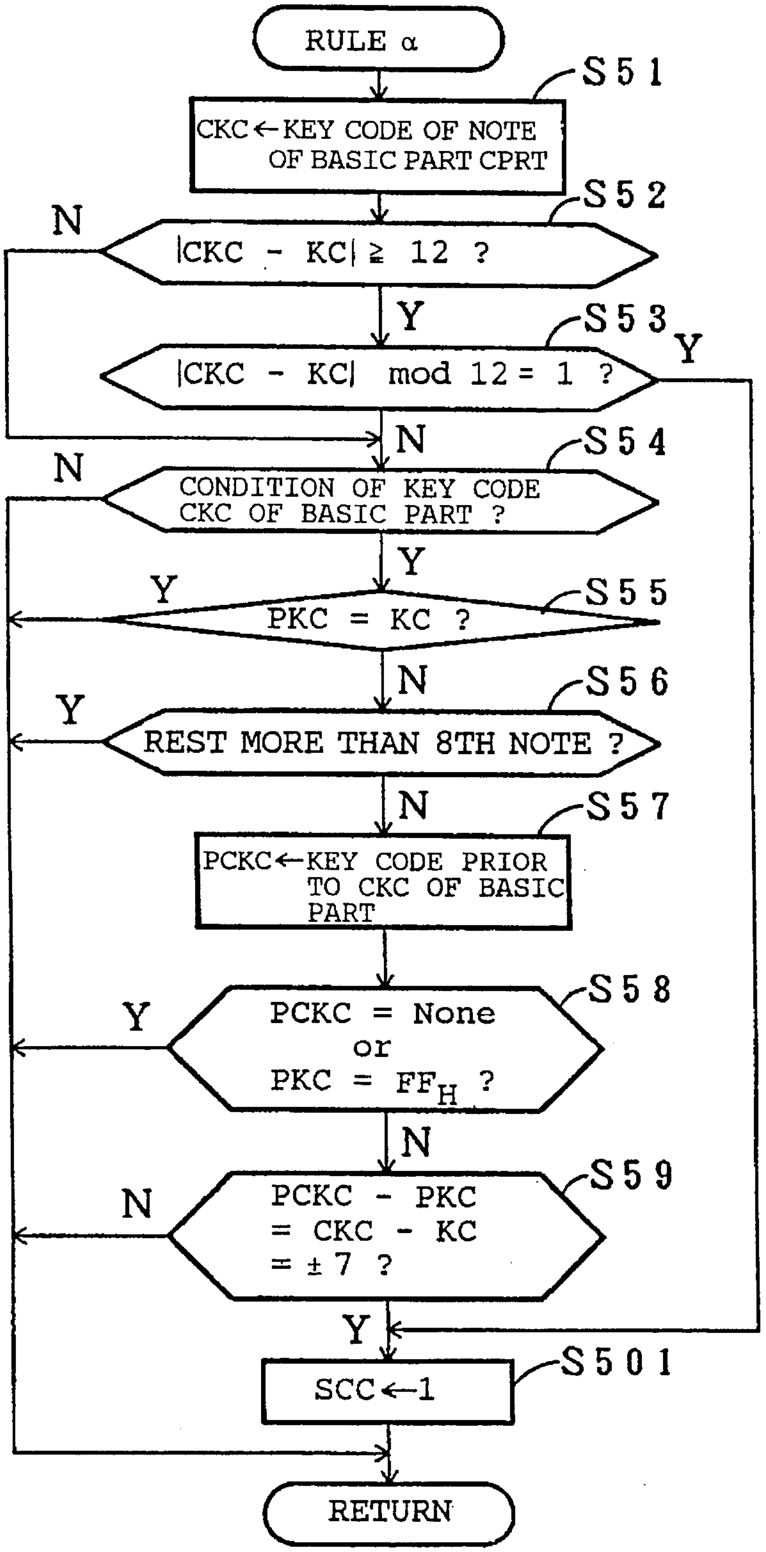
FIG. 8 is a flow chart of a first rule α shown in FIG.

In processing of the first rule α shown in FIG. 8, the CPU 1 stores at step S51 a key code of a note of the basic part CPRT brink sounded by the timing data TM in the register CKC and determines at step S52 whether |CKC–KC| is more than or equal to "12". If an interval of The key code CKC of the basic part and the current key code KC to be processed is within one octave, a difference in tone pitch of the current key code KC and the key code CKC of the basic part does not become the minor 9th interval. Thus, the CPU 1 determines a "No" answer at step S52 and causes the program to proceed to step S54. If the interval of the key code CKC of the basic part and the current key code KC is more than one octave, the CPU 1 determines a "Yes" answer at step 852 and determines at step S53 whether |CKC –KC| mod 12 is "1" or not. If the difference in tone pitch of the current key code KC and the key code CKC of the basic part is the minor 9th interval, the CPU 1 determines a "Yes" answer at step S53 and sets at step S501 the flag SCC as "1". If the answer at step S53 is "No", the program proceeds to step S54 where the CPU 1 determines whether the key code CKC of the basic part is conditioned to be sounded at the same time as the current timing data TM or not. If the answer at step S54 is "No", the key code CKC of the basic part does not become the parallel 5th progression. Thus, the CPU 1 returns the program to the rule routine.

If the answer at step S54 is "Yes", the program proceeds to step S55 where the CPU 1 determines whether the current key code KC is Identical with a preceding key code PKC or not. If the answer at step S55 is "Yes", the program returns to the rule routine. If the answer at step S55 is "No", The program proceeds to step S56 where the CPU 1 determines whether or not there is a rest more than the 8th note between the preceding note and the current note. If the answer at step S56 is "Yes", the program returns to the rule routine. If the answer at step S56 is "No", the program proceeds to step 557 where the CPU 1 stores a key code of a note prior to the note of the key code CKC of the basic pare CPRT or nearest to the note of the basic part being sounded at the same timing as the preceding note of the part to be corrected in the register PCKC and causes the program to proceed to step S58. At step S58, the CPU 1 determines whether the key code PCKC exists or not or whether the preceding key code is identical with "$FF_H$" or not. Namely, the CPU 1 determines whether the note of the basic part being sounded at the same timing as the preceding note includes a key code of a nearest note or whether the note of the current part to be corrected is a first note or not. If the answer at step S58 is "Yes", the program returns to the rule routine. If the answer at step S58 of "No", the CPU 1 determines at step S59 whether a condition of "PCKC–PKC=CKC–KC=±7" is satisfied or not. If the answer at step S59 is "No", the program returns to the rule routine. If the interval of the note of the key code PCKC and the note of the key code PKC is the parallel 5th progression, the CPU 1 determines a "Yes" answer at step S59 and sets at step 501 the flag SCC as "1" After processing step S501, the CPU 1 returns the program to the rule routine.

Figure 9:
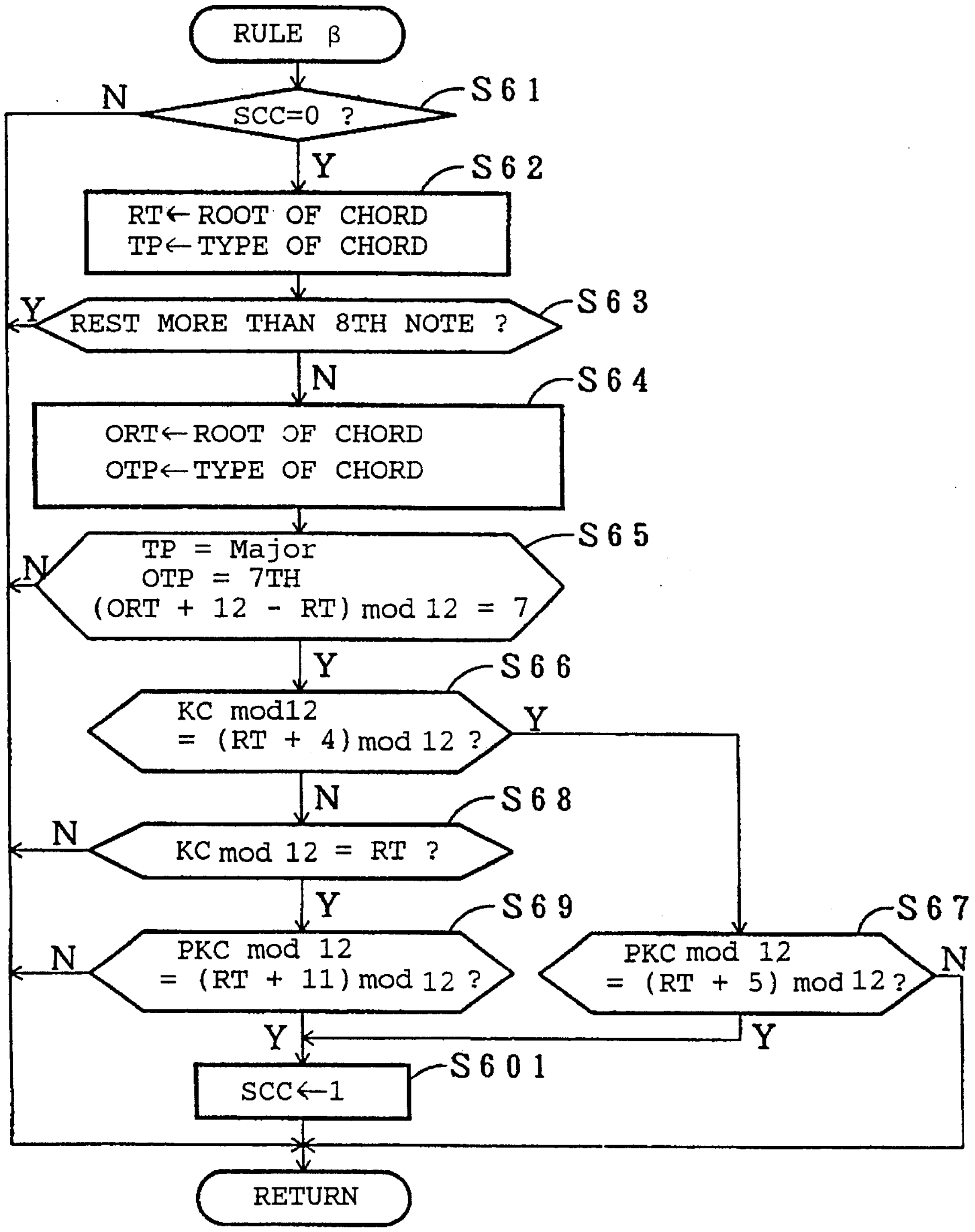
FIG. 9 is a flow chart of a second rule β shown in FIG. 7.

In processing of the second rule β shown in FIG. 9, the CPU 1 determines at step S61 whether the flag SCC is "0" or not. Namely, the CPU 1 determines whether the key code KC has been determined as a prohibition tone by processing of the first rule α or not. If the key code KC has been determined as a prohibition tone, the CPU 1 determines a "No" answer at step 961 and returns the program to the rule routine. If the key code KC has net been determined as a prohibition tone, the CPU 1 determines a "Yes" answer at step S61 and stores at step S62 the root and type of a chord corresponding with the current timing data TM in registers RT and TP. At the following step S63, the CPU 1 determines whether or not there is a rest more than the 8th note between a preceding note and the current note. If the answer at slop S63 is "Yes", the program returns to the rule routine. If the answer at step S63 is "No", the CPU 1 stores at step S64 the root and type of a preceding chord corresponding with the preceding note in the registers ORT and OTP and causes the program to proceed to step S65.

At step 6.5, the CPU 1 determines whether a condition of "TP =Major", "OTP–7th" and "(ORT+12–RT) mod 12=7" is satisfied or not. Namely, the CPU 1 determines whether the chord progression is the major dominant motion or not. If the answer at step S65 is "No", the program returns to the rule routine.

If the answer at step S65 is "Yes", the CPU 1 determines at step S66 whether a condition of "KC rood 12=(RT+4) mod 12" is satisfied or not. If the root of a successive chord of the major dominant motion has changed to a major 3-degree note, the CPU 1 determines a "Yes" answer at step S66 and determines at step S67 whether a condition of "PKC mod 12=(RT+5) mod 12" is satisfied or not. If the answer at step S67 is "No", the program returns to the rule routine. If the answer at step S67 is "Yes", the CPU 1 sets at step S601 the flag SCC as "1" and returns the program to the rule routine. If the answer at step S66 is "No", the CPU 1 determines at step S68 whether a condition of "KC mod 12=RT" is satisfied or not. If the answer at step S68 is "No", the program returns to the rule routine. If the root of the successive chord of the major dominant motion has changed to a tonic chord, the CPU 1 determines a "Yes" answer at step S68 and determines at step S69 whether a condition of "PKC mod 12=(RT+11) rood 12" is satisfied or not. If the answer at step S69 is "No", the program returns to the rule routine. If the preceding note is the 7th note from the root of the successive chord of the dominant motion, the CPU 1 determines a "Yes" answer at step S69 and returns the program to the rule routine after setting the Flag SCC as "1" at step S601.

Figure 10:
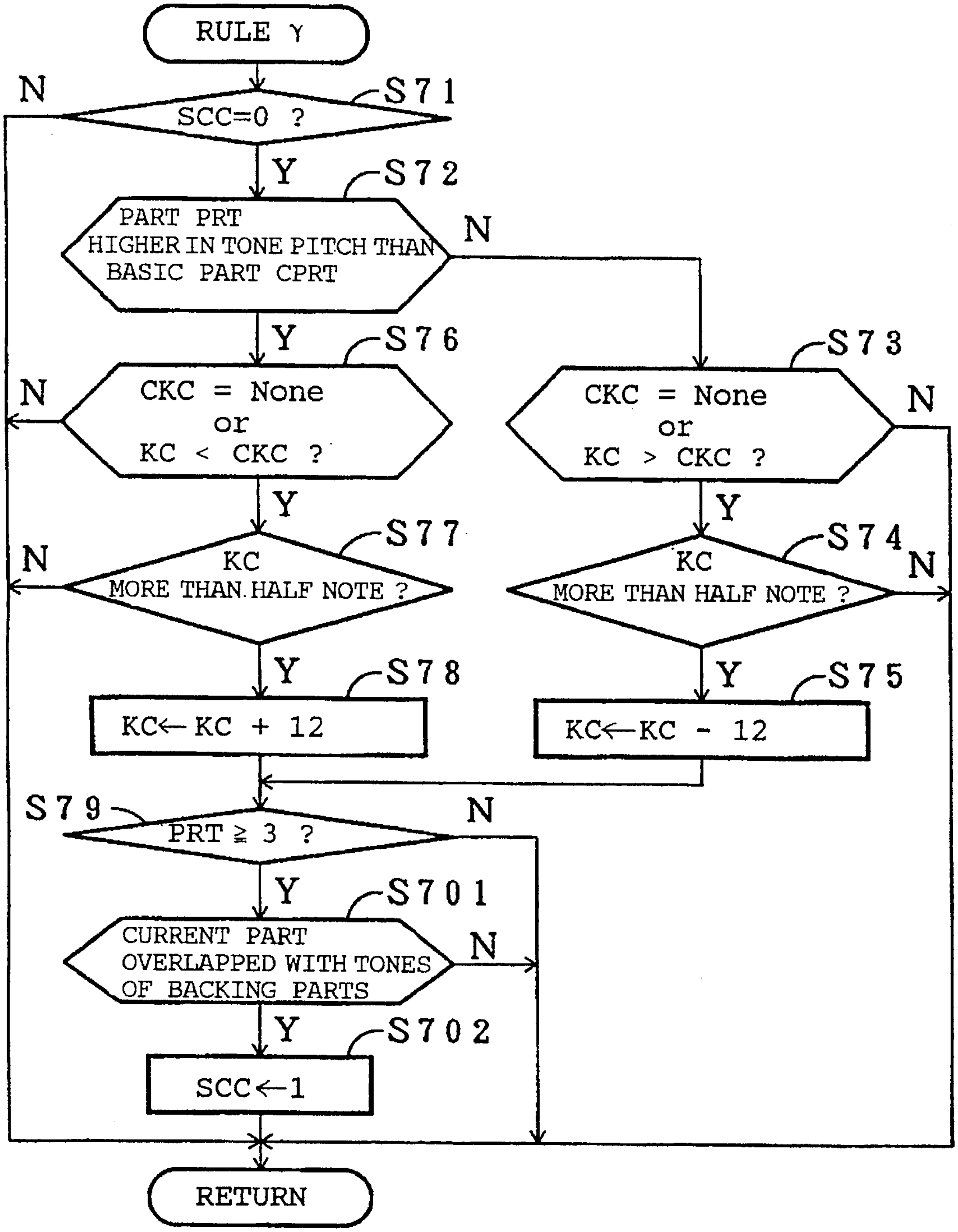
FIG. 10 is a flow chart of a third rule τ shown in FIG. 7.

In processing of the third rule τ shown in FIG. 10, the CPU 1 determines at step S71 whether the flag SCC is "0" or not. Namely, the CPU 1 determines whether or not the current key code KC has been determined as a prohibition tone by processing of the rules α and β. If the current key code KC has been determined as a prohibition tone, the CPU 1 determines a "No" answer at step S71 and returns the program to the rule routine. If the key code KC has not been determined as a prohibition tone, the CPU determines a "Yes" answer at step S71 and determines at step S72 whether the part PRT to be corrected is higher in tone pitch than the basic part CPRT or not. As described above, the tone pitch order of the parts is defined in order or the melody part, the counter melody part, the backing parts (1), (2), (3) and the bass pact from a high level.

If the answer at step S72 is "No", the CPU 1 determines at step S73 whether a condition of "CKC=None" or "KC CKC" is satisfied or not. Namely, the CPU 1 determines whether the note of the basic part being sounded at the same timing as the note preceding note does not include a key code CKC of a nearest note or whether the key code KC of the note of the current part to be corrected is higher than the key code CKC. If the answer at step S73 is "No", the program returns to the rule routine. If the tone pitch of the note is reversed relative to the tone pitch of part, the CPU 1 determines a "Yes" answer at step S73 and determines at step S74 whether the note of the key code KC is more than the half note or not. If the answer at step S74 is "No", the program returns to the rule routine. If the answer at step S74 is "Yes", the CPU 1 lower at step S75 the key code KC of the note by one octave and causes the program to proceed to step S79.

If the part PRT to be corrected is higher than the basic part, the CPU 1 determines a "Yes" answer at step S72 and determines at step S76 whether a condition of "CKC=None" or "KC CKC" is satisfied or not. Namely, the CPU 1 determines whether the note of the basic part being sounded at the same timing as the preceding note does not include a key code CKC of a nearest note or whether the key code KC of the note of the current part to be corrected is lower than the key code CKC or not. If the one pitch of the note is reversed relative to the tone pitch of the part, the CPU 1 determines a "Yes" answer at step S76 and determines at step S77 whether the note of the key code KC is more than the half note or not. If the answer at step S77 is "No", the program returns to the rule routine. If the answer at step S77 is "Yes", the CPU 1 rises the key code KC of the note by one octave at step S78 and causes the program to proceed to step S79. At step S79, the CPU 1 determines whether the current part to be corrected is the backing part (1) or not. If the current part to be corrected is the bass part or the counter melody part, the CPU 1 determines a "No" answer at step S79 and returns the program to the rule routine. If the current part to be corrected is the backing part (1), the CPU 1 determines a "Yes" answer at step S79 and determines at step S701 whether the current part is overlapped with the tones of the backing parts (2), (3) or not. If the answer at step S701 is "No", the program returns to the rule routine. If the answer at step S701 is "Yes", the CPU 1 sets the flag SCC as "1" at step S702 and returns the program to the rule routine. If the octave of the backing part (1) changes by processing at step S701, S702, the backing parts (2), (3) are changed in response to change of the backing part (1).

When the flag SCC is set as "1" by processing of the rules α, β, τ, the key code 1s corrected by processing of the rule of the routine shown in FIG. 7 to modify the accompaniment pattern of the performance information in the edit performance information memory 7 to an accompaniment pattern musically suitable for the applied melody.

Although in the above embodiment the tone pitch conversion, is effected when the part to be corrected is applied with the prohibition rule, the sound timing may be changed or another note may be inserted when the part is in the parallel 5th progression. Although in the above embodiment the performance information of the respective parts except for the melody is selected from the accompaniment pattern stored in the accompaniment information memory 6 and converted in tone pitch in accordance with the chord, the performance information may be automatically produced by other methods.

In a practical embodiment of the present invention, another prohibition rule may be substituted for the prohibition rules in the above embodiment. For example, if the part to be corrected is "♭9th when the root of a chord of the basic part is sounded in a condition where the dominant 7th chord is designated, the part may be modified as "9th". Although in the above embodiment the root of a chord is used if any tone may not be sounded under the prohibition rules, the prohibition rules may be weighted to calculate the weight of the prohibition applied to the part to be corrected thereby to modify the sum of the calculated weights by a smallest tone. In addition, the prohibition rules for a specific part such as the bass part, the melody part or the like may be provided with priority.

Although the above embodiment has been adapted to automatically arrange the part to be prohibited under the prohibition rules, an input device may be provided to input an arrangement data produced by an inexperienced player and designate a part of an original musical tune thereby to apply a portion of the prohibition rules to other parts for automatically correcting a musically inappropriate portion of the part. Furthermore, the prohibition rules or a combination of the same may be selectively applied in accordance with the music genre. For example, only the first rule α may be applied if the music genre is a fusion music.

From the above description, it will be understood that in the automatic arrangement apparatus according to the present invention, musical tone information in the form of a pattern sequence of other plural parts relative to a specific basic part such as a melody part or the like for arrangement of a musical tune is produced or musical tone information of plural parts including the specific basic part is adapted to determine whether a relationship between the plural parts is prohibited under the prohibition rules or not and to correct the tone pitch and timing of the musical tone information of the other plural parts to appropriate musical information for arrangement of the musical tune if the relationship between the plural part is prohibited under the prohibition rules. With such correction of the tone pitch and timing of the musical tone information, a musically inappropriate portion between the respective parts can be reduced during or after automatic arrangement of a musical tune.

What is claimed is:

1. An automatic arrangement apparatus comprising:

means for producing musical information in the form of a pattern sequence of plural parts relative to a specific basic part for arrangement of a musical tune;

conversion means for converting in tone pitch the musical information in accordance with a tone progression;

memory means for memorizing a first prohibition rule related to a relationship between the plural parts to prohibit a tone resulting in an inappropriate tone pitch difference for the arrangement of the musical tune and a second prohibition rule related to the tone progression to prohibit a tone resulting in an inappropriate tone progression for the arrangement of the musical tune;

determination means for determining whether a tone prohibited under the prohibition rules is included in the musical information or not; and correction means for correcting the musical information of the plural parts to appropriate musical information for the arrangement of the musical tune if the tone prohibited under the prohibition rules is included therein.

2. An automatic arrangement apparatus as claimed in claim 1, wherein said memory means is adapted to further memorize a third prohibition rule related to an order of two parts in tone pitch to prohibition a successive tone when two parts of the plural parts are reversed in tone pitch for a predetermined tone length, and wherein said determination means is arranged to further determine whether a successive tone prohibited under the third prohibition rule is included in the musical information or not, and said correction means is arranged to further correct the musical information of the plural parts to appropriate musical information for the arrangement of the musical tune if the successive tone prohibited under the third prohibition rule is included therein.

3. An automatic arrangement apparatus as claimed in claim 1, wherein the first prohibition rule is defined to prohibit a tone resulting in a tone pitch difference of a minor 9th interval and to prohibit a tone resulting in a parallel 5th progression.

4. An automatic arrangement apparatus as claimed in claim 1, wherein the second prohibition rule is defined to prohibit a successive tone when the tone progression changes from a dominant 7th chord to a tonic chord.

5. An automatic arrangement apparatus as claimed in claim 1, wherein said correction means is arranged to correct the tone prohibited under the prohibition rules to a chord constituent tone if it is included in the musical information of the plural parts.

* * * * *